United States Patent [19]
Winkler

[11] Patent Number: 4,768,802
[45] Date of Patent: Sep. 6, 1988

[54] CONTROLLED STEERING DOLLY FOR A TRUCK TRAILER

[75] Inventor: Christopher B. Winkler, Ann Arbor, Mich.

[73] Assignee: The Regents of the University of Michigan, Ann Arbor, Mich.

[21] Appl. No.: 866,453

[22] Filed: May 22, 1986

[51] Int. Cl.$^4$ .................. B62D 13/04; B62D 53/06
[52] U.S. Cl. .................. 280/408; 280/81 A; 280/423 A; 280/426
[58] Field of Search .............. 280/423 R, 423 A, 426, 280/442, 443, 445, 446 R, 446 B, 476 R, 408, 410, 411 R, 411 C, 81 R, 81 B, 508, 81 A, 459, 419

[56] References Cited

U.S. PATENT DOCUMENTS

| | | | |
|---|---|---|---|
| 3,448,999 | 6/1969 | Kollander | 280/81 A |
| 3,522,956 | 8/1970 | Sauer | 280/81 A |
| 3,880,439 | 4/1975 | Wolter | 280/81 A |
| 3,899,188 | 8/1975 | Curry | 280/81 A |
| 4,162,082 | 7/1979 | Curry | 280/408 |
| 4,451,058 | 5/1984 | Curry | 280/423 A |
| 4,460,194 | 7/1984 | McGhie | 280/443 |
| 4,463,966 | 8/1984 | Stoddard | 280/442 |

FOREIGN PATENT DOCUMENTS

| | | | |
|---|---|---|---|
| 3207582 | 9/1983 | Fed. Rep. of Germany | 280/423 A |
| 964713 | 7/1964 | United Kingdom | 280/81 A |

Primary Examiner—John J. Love
Assistant Examiner—Everett G. Diederiks, Jr.
Attorney, Agent, or Firm—James M. Deimen

[57] ABSTRACT

A steerable dolly for a truck trailer resting thereon comprising a steering linkage to turn the dolly wheels relative to the dolly frame, the linkage including an engagement with the trailer that senses the yaw articulation angle of the trailer relative to the dolly frame and causes the linkage to steer the dolly wheels in response to the yaw articulation angle. The steering ratio of the dolly wheels to the yaw articulation angle is a function of the dolly tow bar length for a B-Dolly configuration, the rear overhang of the towing vehicle and the wheel base of the trailer resting on the dolly fifth wheel. The steering ratio may be adjusted by adjusting the effective length of one of the links in the steering linkage.

20 Claims, 5 Drawing Sheets

CONTROLLED STEERING DOLLY FOR A TRUCK TRAILER

This invention was made with Government support under Contract No. DTFH 61-84-C-0026 awarded by the Federal Highway Administration of the United States Department of Transportation. The Government has certain rights in this invention.

BACKGROUND OF THE INVENTION

The field of the invention pertains to truck-trailers and in particular to multi-trailer vehicles commonly known as "doubles" consisting of a tractor, semi-trailer and full trailer or "triples" consisting of a tractor, semi-trailer and two full trailers. With such an arrangement, the first trailer is towed by a fifth wheel mounted on the tractor and each following trailer is a semi-trailer towed by a fifth wheel mounted on a dolly in turn attached by a single point hitch to the back of the first trailer. The most common such vehicle in use in the United States is the "Western Doubles", where both trailers are about 28 feet in length.

The most common and widely used dolly is the so-called A-Dolly, which hitches to the towing vehicle or first trailer using a single point hitch, commonly called a pintle hitch. The A-Dolly provides "wagon tongue" steering for the second trailer by allowing the entire dolly to steer relative to its semi-trailer about the fifth wheel vertical axis on the dolly as well as relative to the towing trailer about the pintle hitch vertical axis. The dolly tires do not, however, steer relative to the dolly frame. Recently, steerable A-Dollies have been developed as disclosed in U.S. Pat. No. 4,451,058.

Commercial vehicles of either truck and full trailer or multi-trailer configurations which employ the above common A-Dollies generally possess undesirable characteristics such as rearward amplification. Rearward amplification, sometimes described as a "crack-the-whip" phenomenon, implies that in rapid evasive maneuvers such as emergency lane changes, the rearward elements such as the second trailer and dolly of the vehicle train experience motions which are substantially amplified compared to the motions of the towing tractor and first trailer. Rearward amplification is known to be the basic cause of many accidents in which roll over of the last trailer or second trailer occurs while the remaining elements of the vehicle remain unscathed. As a result of recent changes in federal road usage laws, the use of multi-trailer vehicles is expected to grow rapidly in the next several years so that concern over rearward amplification and its consequences is expected to increase.

A second general class of dollies known as B-Dollies represent an improvement over A-Dollies. B-Dollies are generally characterized by a double tow bar arrangement which eliminates steering of the dolly with respect to the towing vehicle, most commonly the first trailer. The double hitch also couples the towing vehicle and the dolly and second trailer in roll. The elimination of pintle hitch steering tends to reduce rearward amplification. Coupling in roll further assists in preventing rollover of either of the vehicle trailers.

As an example, B-Dollies can be made in which the dolly tires do not steer relative to the dolly frame. Such a configuration has been found in many cases to lead to unacceptable levels of frame stress and of tire scuffing and wear. Also, difficulties arise in low speed maneuvering. "Steering B-Dollies" in which the dolly tires are allowed to steer by castering mechanisms reduce this problem. However, dolly tires cannot be allowed to steer completely free or undesirable dynamic performance results. The success of a self-steering B-Dolly depends on the compromise between the need for high steering resistance or centering action for good dynamic performance and the need for low steering resistance or centering action for obtaining low levels of stress, scuffing and wear. Such a dolly is disclosed in U.S. Pat. No. 4,162,082. A good compromise is generally quite difficult to attain and the long-term reliability of self-steering B-Dolly mechanisms is of particular concern since degradation of the desired steering resistance over time could lead to dangerous dynamic performance.

Ackerman geometry is well known as the most desirable case for low speed maneuvering since it minimizes tire scuffing, wear and structural stress. With Ackerman geometry all tires of the dolly and the tires on the rear axles of both the first and second trailers are aligned tangent to circular paths which all have the same turn center. An example of Ackerman geometry as applied to the steering of the rear tandem wheels of a semi-trailer is disclosed in U.S. Pat. No. 2,342,697.

SUMMARY OF THE INVENTION

The new B-Dolly concept disclosed below is directed to obtaining a desired improvement in dynamic performance relative to the A-Dolly equipped truck-trailer and is directed to minimizing the undesirable problems of frame stress and tire wear while maintaining positive control of dolly tire steering.

The new B-Dolly is a double drawbar dolly wherein the tires of the dolly are caused to steer in response to the angle of yaw articulation between the dolly and the trailer resting on the dolly fifth wheel. Yaw articulation is angular movement of the trailer about a vertical axis through the fifth wheel. The dolly fifth wheel yaw articulation angle with respect to the trailer resting thereon is sensed and utilized in a manner such that the rear tires of the towing trailer to which the dolly is attached by the double drawbar, the tires of the dolly, and the rear tires of the trailer resting on the dolly all maintain either exactly or with acceptable approximation an Ackerman steering relationship. Thus, the above tires of interest all, in the yaw plan view, retain a relationship in which the extensions of the spin axes of the wheels intersect at a common point. The use of the yaw articulation angle between the dolly and towed trailer to steer the dolly wheels is believed new. Computer aided dynamic analysis and prototype testing have demonstrated that a B-Dolly using this steering geometry also reduces rearward amplification, the crack-the-whip-phenomenon.

While a variety of steering mechanisms, which use yaw rotation of the trailer resting on the dolly fifth wheel about the fifth wheel kingpin to steer the dolly tires in the appropriate manner, can be imagined, a general rule implied by Ackerman geometry can be approximated when the steering ratio is established as a function of the overhang of the towing unit (the trailer towing the dolly), the dolly geometry and the wheel base of the trailer resting on the dolly. For small steering angles about the fifth wheel center, steering can be considered exactly Ackerman. As steering gets very large, the steering ratio must change slightly to maintain precise Ackerman geometry.

A working prototype B-Dolly has been constructed with a mechanism that senses the yaw articulation angle and steers the dolly wheels in response thereto. The working prototype uses a steering system in which a steering arm attached to a vertical shaft axially aligned through the fifth wheel center, i.e. kingpin, engages a depression or socket in the underside of the landing plate of the trailer resting on the dolly fifth wheel. The articulation of the dolly and trailer causes a rotation of this steering arm and shaft relative to the dolly. This rotation in turn causes appropriate motions of several steering system links. The dolly wheels are caused to steer as a result.

The steering arm is fitted with a modified car trailer ball hitch, which actually engages the socket or depression in the trailer landing plate. The steering arm pivots about a horizontal axis and is spring loaded upwardly. As the dolly is being hitched to the trailer, the fifth wheel of the dolly contacts the front end of the trailler landing plate, causing the steering arm to flex downward and the ball to move down and slide under the landing plate. After hitching is complete and the vehicle train moves forward at low speed, the steering arm will cross the longitudinal centerline of the trailer in the initial maneuvering of the vehicle train. As this happens, the spring loading causes the ball on the steering arm to move upward and engage the landing plate depression or socket. The landing plate depression or socket is formed with a tapered lead, so that the ball is guided downward, out of the depression during unhitching of the dolly and trailer. Camming members mounted on the dolly also cause the steering arm and ball to move downward out of the depression at extreme turning or yaw articulation of the dolly relative to the trailer resting thereon. Although disclosed below with respect to a single axle B-Dolly, the new steering means is applicable to multi-axle dollies and A-Dollies.

DESCRIPTION OF THE PREFERRED EMBODIMENT

Figure 1:
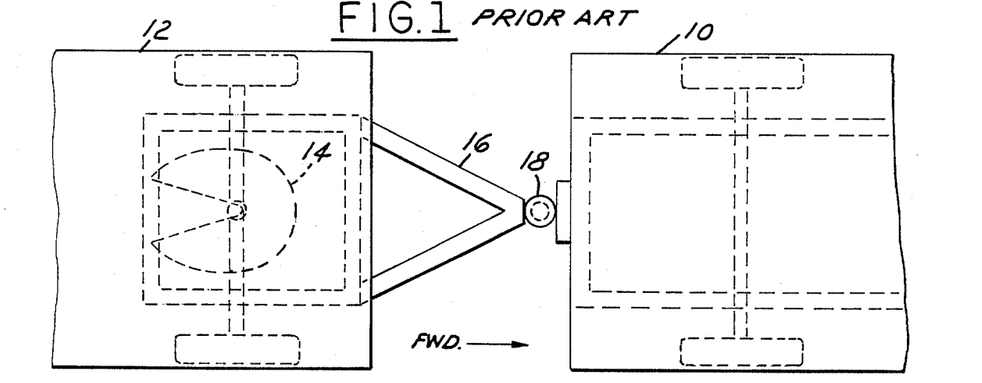
FIG. 1 is a partial schematic top view of a prior art A-Dolly connection between towing and towed trailers.

FIG. 1 illustrates in plan view the rearend of a towing vehicle 10 such as a semi-trailer attached to a tractor (not shown) and the forward end of a towed vehicle such as a second trailer 12. The forward end of the towed trailer 12 rests upon a fifth wheel 14 in turn affixed to a dolly 16. Typical of the prior art, the kingpin of the towed trailer 12 permits the towed trailer to rotate about a vertical axis through the center of the fifth wheel 14 which in turn is typically above, or slightly forward of, the center of the axle for a single axle dolly as shown in FIG. 1. The dolly 16 shown in FIG. 1 is referred to as an A-Dolly, the dolly being attached by a single point hitch or pintle hitch 18 to the towing trailer 10. The dolly 16 is therefore also rotatable about a vertical axis through the single point hitch 18. The two vertical axes, or yaw axes, hitch 18 and the fifth wheel 14 center of the dolly, contribute to the problems with rearward amplification or the "crack-the-whip" phenomenon. Also, the pintle hitch 18 is generally not sufficiently rigid or structurally strong enough to prevent rollover of the towed trailer 12 during a relatively violent maneuver of the trailers 12 and 10.

Figure 2:
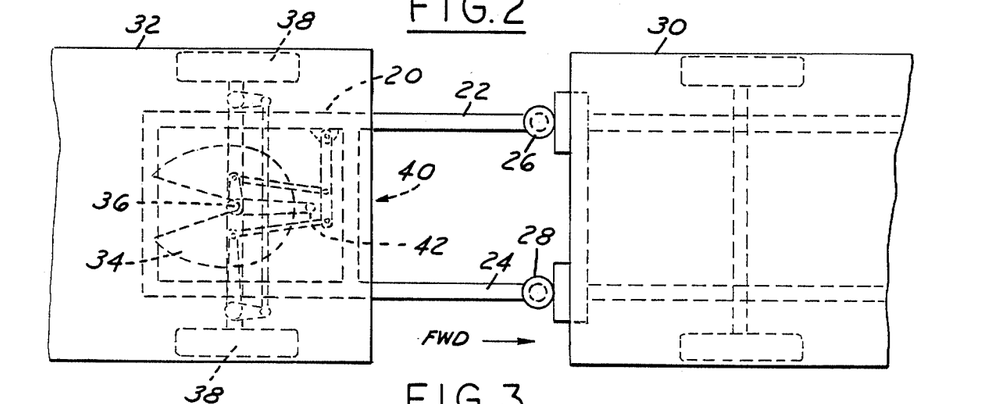
FIG. 2 is a partial schematic top view of the new B-Dolly connection between the towed and towing trailers.
Figure 3:
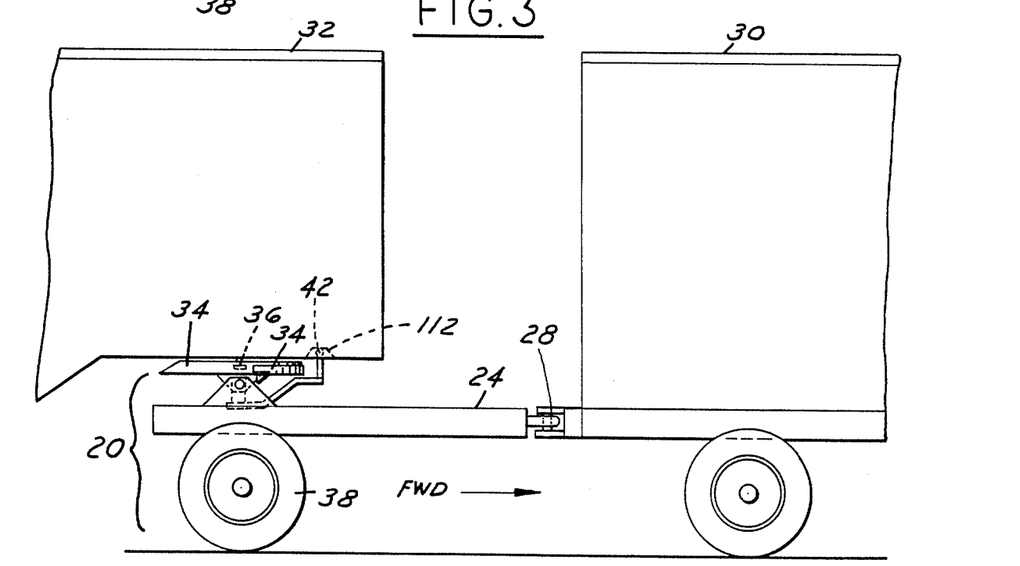
FIG. 3 is a partial schematic side view showing the B-Dolly connection between the towed and towing trailers of FIG. 2.

FIGS. 2 and 3 illustrate in plan view and in side view a B-Dolly 20 configuration directed to overcoming the problems with an A-Dolly configuration but nevertheless providing good maneuverability and substantially eliminating the excessive streses and tire wear of prior art B-Dolly configurations. In FIG. 2 the B-Dolly comprises double drawbar 22 and 24 attachments 26 and 28 to the rear of a towing vehicle or trailer 30. With the double drawbar attachments 26 and 28, the B-Dolly 20 frame is prevented from articulating in yaw relative to the towing trailer 30. The double drawbar 22 and 24 configuration structurally stabilizes the towed trailer 32 against rollover during a violent maneuver. The fifth wheel 34 and its attachment to the dolly 20 remains basically conventional with the trailer 32 capable of rotating in yaw about the vertical kingpin 36. The kingpin is centered directly over, or slightly forward of, the transverse line joining the spin axes of the wheels 38 of a two wheel B-Dolly. The B-Dolly of FIGS. 2 and 3 is equipped with a mechanism (generally denoted by 40) to turn the wheels 38 in response to the yaw angle of the towed trailer 32 with respect to the longitudinal centerline of the B-Dolly 20 and towing trailer 30. The yaw angle is sensed by, and the steering mechanism 40 actuated to turn the wheels 38 by, a ball and socket engagement (generally denoted by 42) between the towed trailer 32 and mechanism 40. The mechanism 40, to be disclosed in more complete detail below, causes the wheels 38 to be turned the appropriate amount to substantially minimize tire scuffing and overstress of the B-Dolly as the vehicle train turns.

Figure 4:
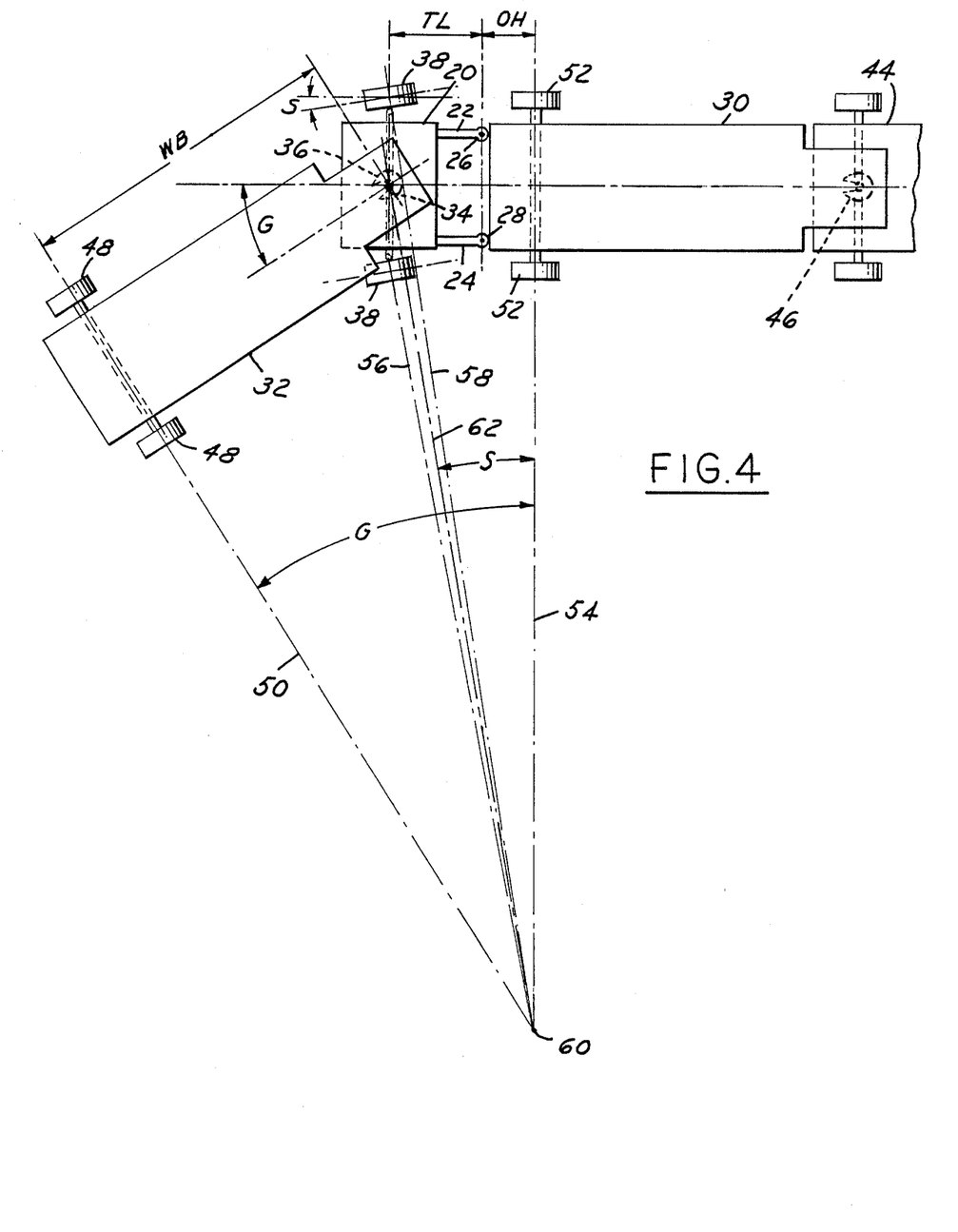
FIG. 4 is a schematic view of the Ackerman geometry relationship between the towed and towing trailers.

The schematic plan view of FIG. 4 illustrates the Ackerman geometric relationship for a multi-trailer vehicle train comprising a tractor 44 attached by a fifth wheel 46 to a first semi-trailer 30 in turn towing a B-Dolly 20. The B-Dolly is also equipped with a fifth wheel 34 supporting the second towed trailer 32 shown yawed with respect to the B-Dolly 20 and towing trailer 30. Ackerman geometry prescribes that the extension of the spin axis of each of the wheels pass through a common turn center point. As illustrated, the rear wheels 48 of the towed trailer 32 rotate about the axis 50 and the rear wheels 52 of the towing trailer 30 rotate about the axis 54. For Ackerman geometry, the B-Dolly wheels 38 should each be turned the appropriate amount to cause the spin axes 56 and 58 to pass through the common turn center point 60 at which the axes 50 and 54 cross. A line 62 drawn through the kingpin 36 and the point 60 will, except at very large turning angles, substantially approximately the spin axes 56 and 58 of the wheels 38 of the B-Dolly 20.

A geometric relationship for Ackerman geometry can determine the steering angle S as a function of the yaw angle G of the trailer 32. This angular relationship may be expressed in terms of the overhang OH of the towing trailer 30, and the towbar length TL of the dolly 20, and the wheel base WB of the towed trailer 32. The relationship may be expressed as follows:

$$\frac{S}{G} = \frac{OH + TL}{WB + OH + TL}$$

Figure 5:
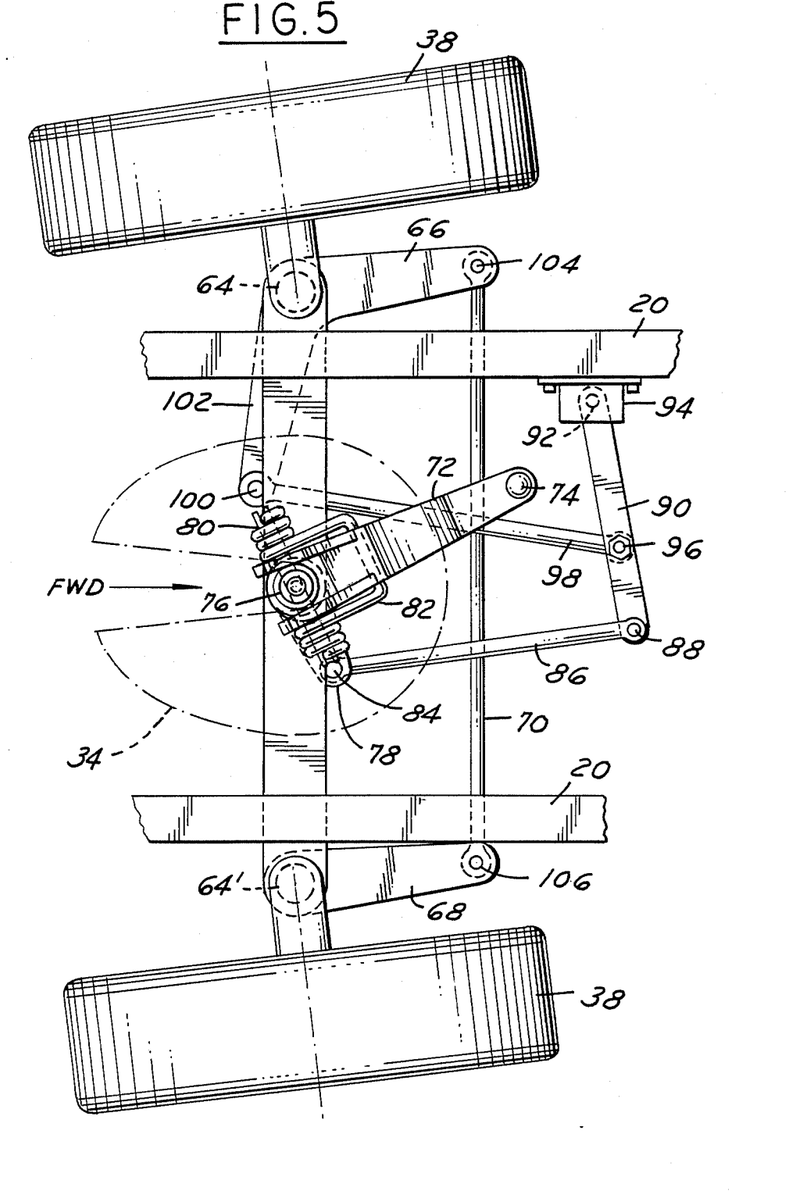
FIG. 5 is a top view schematic of the mechanical linkage for steering the B-Dolly wheels.
Figure 6:
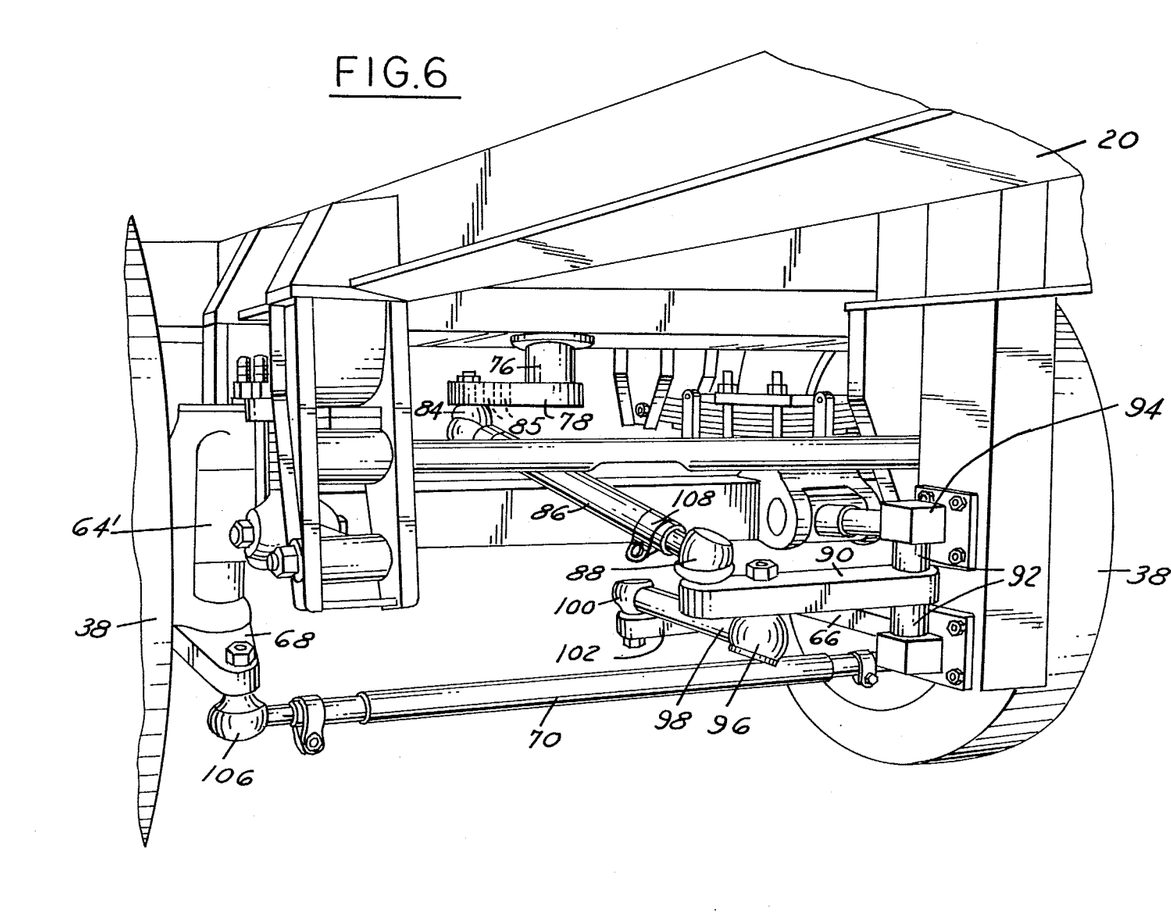
FIG. 6 is an underside partially cut away perspective view of the B-Dolly prototype.

With this geometric relationship in mind, the mechanical linkage shown in FIGS. 5 and 6 has been designed, constructed and tested in prototype form. FIG. 5 illustrates in plan view the linkage arrangement and FIG. 6 in more detail illustrates the actual prototype linkage arrangement from underneath. In FIG. 5, the B-Dolly frame 20 is shown with the wheels 38 slightly turned. Above the frame 20 the fifth wheel is shown in ghosted outline 34. The B-Dolly wheels 38 are mounted on axles for rotation and the axles in turn attached to steering knuckles for steering about vertical steering axes, 64 and 64'. Left 66 and right 68 steering arms for the wheels 38 are joined together by a tie rod 70. This rotation of the left steering arm 66 about steering axis 64 causes simultaneous rotation of the right steering arm 68 about steering axis 64'.

Figure 7:
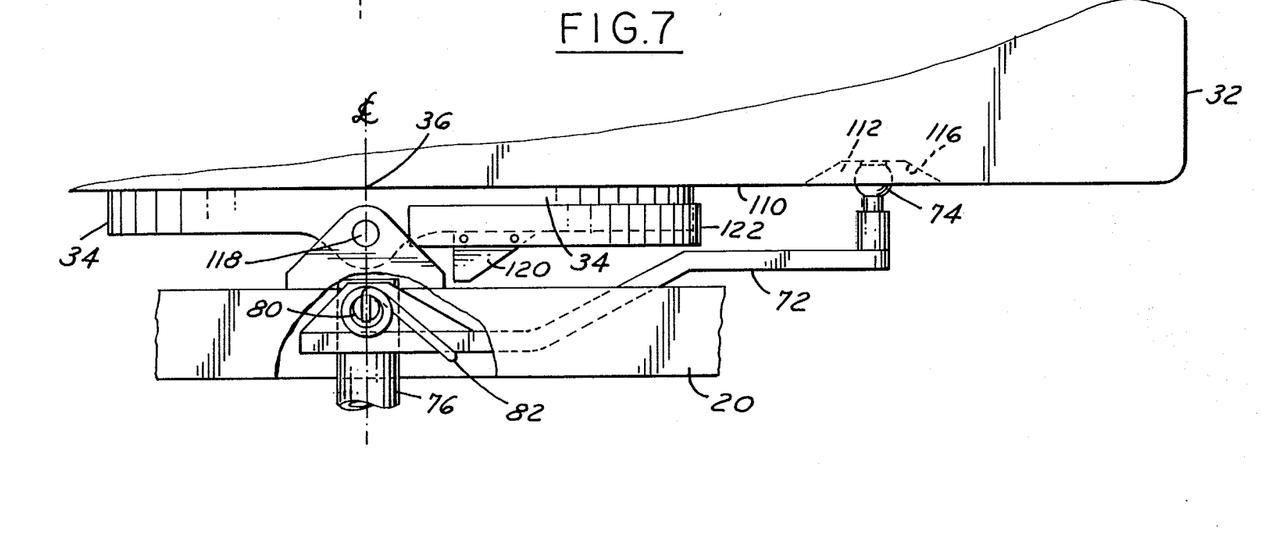
FIG. 7 is a side view schmatic of the fifth wheel connection and new steering connection between the B-Dolly and the towed trailer resting thereon.

Extending out from under the fifth wheel 34 and above the frame of the B-Dolly 20 is an upper steering arm 72 have a steering ball 74 extending upwardly therefrom. The upper steering arm 72 is affixed to a pivot shaft 76 rotatable about a vertical axis coincident with the center vertical axis of the fifth wheel and the kingpin of the towed trailer. However, the pivot shaft 76 is located therebelow and in turn is affixed to a lower steering arm 78, better shown in FIG. 6. Movement of the upper steering arm 72 in the horizontal plane causes movement of the lower steering arm 78 also in a horizontal plane therebelow. Although the lower steering arm 78 is rigidly fastened to the pivot shaft 76, the upper steering arm 72 is affixed to the pivot shaft 76 by a horizontal pin 80 for rotation about a horizontal axis as best shown in FIG. 7. The horizontal pin 80 also supports a spring 82 which urges the upper steering arm 72 and ball 74 upwardly.

The lower steering arm 78 is connected by a ball and socket joint 84 to a first steering link 86. The first steering link 86 in turn is connected by another ball and socket joint 88 to an idler arm 90. The idler arm 90 in turn is rotatable about a pair of idler arm pivot bearings at 92 mounted for support to a depending brace 94 from the frame of the B-Dolly 20. Thus, horizontal movement of the lower steering arm 78 causes horizontal rotational movement of the idler arm 90 about the vertical axis through the pivot bearings 92. A ball joint at 96 connects the idler arm 90 to the second steering link 98 which in turn is connected through a ball joint 100 to the second arm 102 of the left wheel steering arm 66. The second arm 102 is integral with the left wheel steering arm 66. Thus, movement of the lower steering arm 78 causes turning movement simultaneously of both steering arms 66 and 68 and the wheels 38 of the B-Dolly. The ball joints 84, 88, 96 and 100 as well as ball joints 104 and 106 on the ends of the tierod 70 are ball joints commonly used for steering tierod ends on heavy duty trucks. As best shown in FIG. 6 these ball joints include the adjustments 108 commonly used for wheel alignment purposes.

Figure 8:
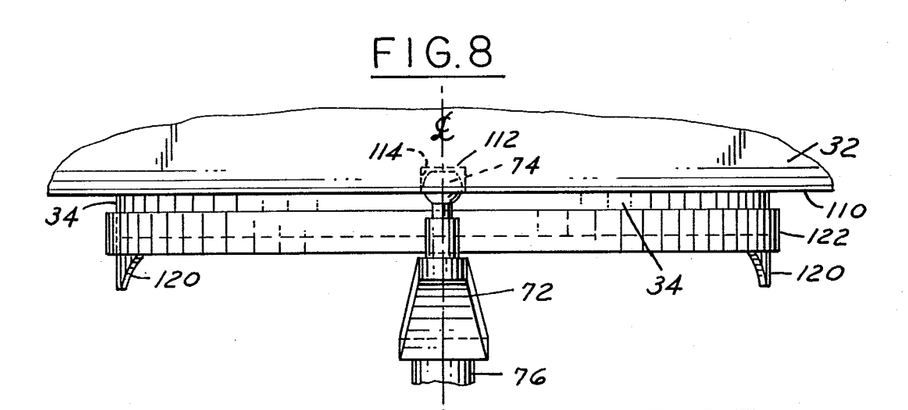
FIG. 8 is a front view schematic of the fifth wheel and new steering connection between the B-Dolly and the towed trailer resting thereon.

Referring to FIGS. 7 and 8 the front of the trailer 32 is equipped with an upper fifth wheel plate 110 extending from the front of the trailer over the location of the fifth wheel 34 about the kingpin 36. This is a common construction for semi-trailer units adapted to attach to fifth wheels whether they be on towing tractors or dollies. For use with the new B-Dolly configuration of this application, the trailer upper fifth wheel plate structure is modified by cutting and welding in a depression or socket 112 having vertical side walls 114 and tapered end walls 116 and adapted to engage the steering arm ball 74 of the B-Dolly 20. The engagement is therefore loose in the trailer longitudinal direction and snug in the lateral direction. The steering arm springs 82 urge the upper steering arm 72 and ball 74 into the depression or socket 112.

Initially, when the trailer is being engaged to the B-Dolly, the steering arm ball 74 and upper steering arm 72 are pushed downward by the upper fifth wheel and remain pushed downward with engagement of the kingpin 36 to the fifth wheel 34 unless the longitudinal axis of the trailer coincides substantially with the longitudinal axis of the B-Dolly, which in the latter case allows the steering arm ball 74 to immediately snap upward into the depression 112.

In most instances the longitudinal axis of the trailer will not immediately coincide with the longitudinal axis of the B-Dolly. However, with the first maneuvering of the dolly and trailer, in particular, forward motion of the vehicle train, the longitudinal axes of the dolly and trailer will align and the steering arm ball 74 will engage the depression 112. Henceforth, the steering arm ball 74 and upper steering arm 72 will be caused by the socket 112 vertical walls 114 to follow the rotational movement of the trailer in yaw about the kingpin 36 vertical axis. Thus, as the trailer turns in yaw about the vertical axis through the kingpin 36 and fifth wheel 34, the vertical steering shaft 76 will be rotated thereby rotating the lower steering arm 78 and moving the linkage described above to turn the wheels 38 of the dolly.

The steering ratio is determined by the Ackerman geometry as noted above with reference to FIG. 4. As a part of this geometric relationship the wheel base, WB, of the towed trailer 32 and the overhang, OH, of the towing trailer 30 are parameters that are likely to change with differing trailers. For differing applications, B-Dollies 20 of differing tow bar lengths, TL, may also be desirable. Changes of any of these parameters will change the preferred steering ratio. Returning to FIG. 6, the linkage may be adjusted for steering ratio by providing means to adjust the distance between the vertical shaft 76 and the ball joint attachment 84 of the first steering link 86 to the lower steering arm 78. Several holes 85 in a row may be provided in the lower steering arm 78 so that the effective steering ratio may be selectably changed over a range.

At extreme yaw articulation angles approaching 90°, the upper steering arm 72 and the trunnions 118 supporting the fifth wheel 34 on the B-Dolly 20 frame will interfere. To prevent such interference cams 120 are attached to either side of the undersurface of the fifth wheel 34. The cams 120 upon engagement by the upper steering arm 72 cause the latter to move downward thereby disengaging the ball 74 from the socket 112 and preventing damage to the mechanism. Upon movement to a lesser yaw articulation angle the ball 74 will be reengaged with the socket 112. Ahead of the cams 120 and extending about the front of the fifth wheel is a curved plate 122. The curved plate 122 prevents the upper steering arm 72 from excessive upward motion when no trailer is resting on the dolly.

I claim:

1. A truck trailer dolly comprising a frame and means on the frame for attachment to a towing vehicle, support means on the dolly to engageably support the forward end of a towed trailer, said support means including articulation means to permit both pitch and yaw articulation of a towed trailer relative to the dolly frame, a plurality of wheels mounted on the dolly frame, said wheels steerable relative to the dolly frame and means on the dolly including a first steering arm having a first end portion in mechanical engagement with a towed trailer to actuatably steer the dolly wheels in response to the yaw articulation of a towed trailer relative to the dolly frame, said first steering arm being rotatable about a horizontal axis to accommodate the pitch articulation of the towed trailer relative to the dolly frame.

2. The dolly of claim 1 wherein the first end portion of the first steering arm is spaced from a yaw articulation axis of the articulation means.

3. The dolly of claim 2 wherein the support means and articulation means comprise a fifth wheel and towed trailer king pin engagement means on the fifth wheel, and a second end portion of said first steering arm on the dolly is rotatable about a vertical axis and said first end portion of the first steering arm includes means spaced from the steering arm vertical axis to engage a towed trailer.

4. The dolly of claim 3 wherein the means on the first steering arm to engage a towed trailer is spaced from the king pin engagement means.

5. The dolly of claim 4 wherein the first steering arm vertical axis is coincident with the yaw articulation axis of the articulation means.

6. The dolly of claim 5 wherein the means on the frame for attachment to a towing vehicle substantially prevents yaw articulation of the dolly frame relative to a towing vehicle.

7. The dolly of claim 1 wherein the means on the frame for attachment to a towing vehicle comprise a pair of attachments spaced apart horizontally to substantially prevent yaw articulation of the dolly frame relative to a towing vehicle.

8. The dolly of claim 7 wherein the engageable support means and articulation means comprise a fifth wheel and towed trailer king pin engagement means on the fifth wheel, and a second end of said first steering arm on the dolly is rotatable about a vertical axis and said first end portion of the first steering arm includes means spaced from the first steering arm vertical axis to engage a towed trailer.

9. The dolly of claim 8 wherein the steering arm vertical axis is coincident with a yaw articulation axis of the articulation means.

10. The dolly of claim 8 wherein the steering means includes a second steering arm connected to and rotatable with the first steering arm, said second steering arm including means to adjust the effective length of the second steering arm.

11. The dolly of claim 1 wherein the steering means include means to sense the yaw articulation of a towed trailer and in response thereto, to cause the steering means to turn the steerable wheels in fractional proportion to the yaw articulation angle.

12. A truck trailer dolly comprising a frame and means on the frame for attachment to a towing vehicle, support means on the dolly to engageably support the forward end of a towed trailer, said support means including articulation means to permit both pitch and yaw articulation of a towed trailer relative to the dolly frame, a plurality of wheels mounted on the dolly frame, said wheels being steerable relative to the dolly frame and steering means on the dolly comprising a mechanical linkage engageable with the underside of a towed trailer resting on the support means to actuatably steer the dolly wheels in response to the yaw articulation of a towed trailer relative to the dolly frame, said mechanical linkage being rotatable about a horizontal axis to accommodate the pitch articulation of the towed triler relative to the dolly.

13. The dolly of claim 12 wherein the mechanical linkage engagement includes an upper steering arm rotatable about a vertical axis, a ball on the upper steering arm spaced from the vertical axis and engageable with a socket formed in the underside of a towed trailer resting on the support means.

14. The dolly of claim 13 wherein the mechanical linkage engagement includes a lower steering arm actuatably connected to the upper steering arm for rotational movement therewith, an idler arm rotatable about a vertical axis and actuatably connected to the lower steering arm for movement in response to movement of the lower steering arm, and left and right wheel steering arms actuatably connected to the idler arm for movement in response to movement of the idler arm.

15. The dolly of claim 12 wherein the mechanical linkage engagement includes an upper steering arm rotatable about a vertical axis and rotatable about a horizontal axis, and means on the upper steering arm for engagement with complementary engagement means on a towed trailer resting on the support means, said engagement means on the upper steering arm spaced from both rotational axes of the upper steering arm, and means urging the upper steering arm and upper steering arm engagement means upward about the horizontal axis.

16. The dolly of claim 12 wherein said mechanical linkage includes means urging the steerable wheels toward the 0° (G=0°) yaw articulation position.

17. The dolly of claim 12 including disengagement means on the dolly, said disengagement means engageable with at least one element of the mechanical linkage as the yaw articulation angle approaches 90° to disengage the mechanical linkage engagement with a towed trailer resting on the support means.

18. The dolly of claim 17 wherein the disengagement means on the dolly comprises at least one cam engageable with an element of the mechanical linkage.

19. The dolly of claim 12 including a towed trailer resting on the support means, said trailer including engagement means on the trailer underside complementary to the mechanical linkage engagement of the dolly.

20. A trailer towing arrangement comprising in combination, a towing vehicle, a towed trailer, and a dolly interposed between the towing vehicle and the towed trailer, said dolly comprising a frame and means on the frame for attachment to the towing vehicle, support means on the dolly to engageably support the forward end of the towed trailer, said support means including articulation means to permit both pitch and yaw articulation of the towed trailer relative to the dolly frame, a plurality of wheels mounted on the dolly frame, said wheels being steerable relative to the dolly frame, means attached to the underside of the trailer which articulates with the trailer, steering means on the dolly including a mechanical linkage rotatable about a vertical axis, said mechanical linkage being engageable with the means which articulates with the trailer such that said mechanical linkage articulates about said vertical axis in response to yaw articulation of the trailer, said mechanical linkage being interconnected to the steerable dolly wheels to actuatably steer the dolly wheels in response to the articulation of the towed trailer relative to the dolly frame, said mechanical linkage being further rotatable about a horizontal axis to accommodate the pitch articulation of the towed trailer relative to the dolly frame.

* * * * *

UNITED STATES PATENT AND TRADEMARK OFFICE
CERTIFICATE OF CORRECTION

PATENT NO.    : 4,768,802
DATED         : September 6, 1988
INVENTOR(S)   : Christopher B. Winkler It is certified that error appears in the above-identified patent and that said Letters Patent are hereby corrected as shown below:

Column 1, line 6: Delete "0026" and substitute --00026--.

Column 3, line 19: Delete "trailler" and substitute --trailer--.

Signed and Sealed this

Twenty-fifth Day of April, 1989

Attest:

DONALD J. QUIGG

*Attesting Officer*          *Commissioner of Patents and Trademarks*